(12) United States Patent
Penn et al.

(10) Patent No.: US 8,690,340 B2
(45) Date of Patent: Apr. 8, 2014

(54) COMBINED IMAGE PROJECTION AND CAPTURE SYSTEM USING ON AND OFF STATE POSITIONS OF SPATIAL LIGHT MODULATOR

(75) Inventors: Steven M. Penn, Plano, TX (US); Duane S. Dewald, Dallas, TX (US); Matthew G. Hine, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 430 days.

(21) Appl. No.: 12/334,240

(22) Filed: Dec. 12, 2008

(65) Prior Publication Data

US 2010/0149493 A1    Jun. 17, 2010

(51) Int. Cl.
*G06M 7/00* (2006.01)
*H01L 27/00* (2006.01)
*G03B 21/26* (2006.01)
*G03B 21/28* (2006.01)
*G06F 3/042* (2006.01)

(52) U.S. Cl.
USPC .......... 353/30; 250/208.1; 250/221; 345/175; 353/98

(58) Field of Classification Search
USPC .............. 250/208.1, 221, 216; 345/173, 175, 345/176, 179–183, 207, 1.2; 348/744, 750, 348/751, 758–761, 766, 770, 771; 353/94, 353/98, 99, 30, 31, 37, 42, 81, 119; 359/196.1, 201.2, 237, 245, 263
See application file for complete search history.

(56) References Cited

U.S. PATENT DOCUMENTS

| 5,612,736 A * | 3/1997 | Vogeley et al. ........... 348/207.99 |
| 7,525,538 B2 * | 4/2009 | Bathiche ........................ 345/175 |
| 2007/0040921 A1 * | 2/2007 | Davis et al. .................... 348/305 |

* cited by examiner

*Primary Examiner* — Pascal M Bui Pho
(74) *Attorney, Agent, or Firm* — Warren L. Franz; Wade J. Brady, III; Frederick J. Telecky, Jr.

(57) ABSTRACT

According to one embodiment of the present invention a method for capturing images on a screen is disclosed. The method includes directing light from a surface of a spatial light modular to an image field using a projection system; capturing light from the image field using the projection system, the projection system directing at least a portion of the captured light to the spatial light modulator; and directing at least a portion of the received captured light to an image capture system using the spatial light modulator.

9 Claims, 3 Drawing Sheets

COMBINED IMAGE PROJECTION AND CAPTURE SYSTEM USING ON AND OFF STATE POSITIONS OF SPATIAL LIGHT MODULATOR

TECHNICAL FIELD

This invention relates in general to a combined image projection and image capture system and method.

BACKGROUND

Image projection systems often involve directing light towards a display such that an image is produced. One way of effecting such an image is through the use of spatial light modulators such as digital micromirror devices (DMD) available from Texas Instruments. With DMD display systems, in general, light is directed through a lens array to a DMD array having numerous micromirrors. Each micromirror is selectively controlled to reflect the light towards a particular portion of a display, such as a pixel. The angle of a micromirror can be changed to switch a pixel to an "on" or "off" state. The micromirrors can maintain their "on" or "off" state for controlled display times.

Image capture systems, in general, often involve camera systems that include one or more sources of light, lenses, light sensors or detectors, and processing technology for detecting and processing the image. The image can be formed on a surface or screen.

Light processing systems can be enhanced with the addition of the ability to capture an image at the same surface on which an image is projected. Combining a light processing system with an image detection and capture system can involve additional optical and electronic components that can be difficult to align, costly, and of unpredictable performance.

SUMMARY

According to one embodiment of the present invention a method for displaying and capturing images on a screen is disclosed. The method includes directing light from a surface of a spatial light modulator to an image field using a projection system; capturing light from the image field using the projection system, the projection system directing at least a portion of the captured light to the spatial light modulator; and directing at least a portion of the received captured light to an image capture system using the spatial light modulator.

In another embodiment, an image display and capture system is disclosed. The system includes a spatial light modulator comprising a surface positioned to direct light to a projection system; the projection system positioned to direct light from the spatial light modulator to an image field; the projection system also positioned to capture light from the image field and direct at least a portion of the captured light to the spatial light modulator; and the spatial light modulator also positioned to direct at least a portion of the received captured light to an image capture system.

Certain embodiments may provide a number of technical advantages. For example, a technical advantage of one embodiment may include increased system efficiency and lower power usage. Other technical advantages of other embodiments may include faster and more accurate interaction detection.

Although specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

It should be understood at the outset that although example implementations of embodiments of the invention are illustrated below, the present invention may be implemented using any number of techniques, whether currently known or in existence. The present invention should in no way be limited to the example implementations, drawings, and techniques illustrated below. Additionally, the drawings are not necessarily drawn to scale and do not necessarily contain all optical elements related.

Image display systems can be combined with image capturing systems to facilitate systems that allow interaction with displayed images. These systems can include spatial light modulators such as a digital micromirror device (DMD). A DMD is a micro-electromechanical device comprising an array of hundreds of thousands of tilting digital micromirrors. From their flat or resting state, the micromirrors may be actively tilted, for example, to a positive or negative angle corresponding to an "on" state and an "off" state. Light from a light source is directed to the DMD's "active area" whereupon it is reflected off the DMD's micromirrors to an image field for displaying images. Combined systems can also include various components for facilitating image capture and display interaction discussed more fully below.

Figure 1A:
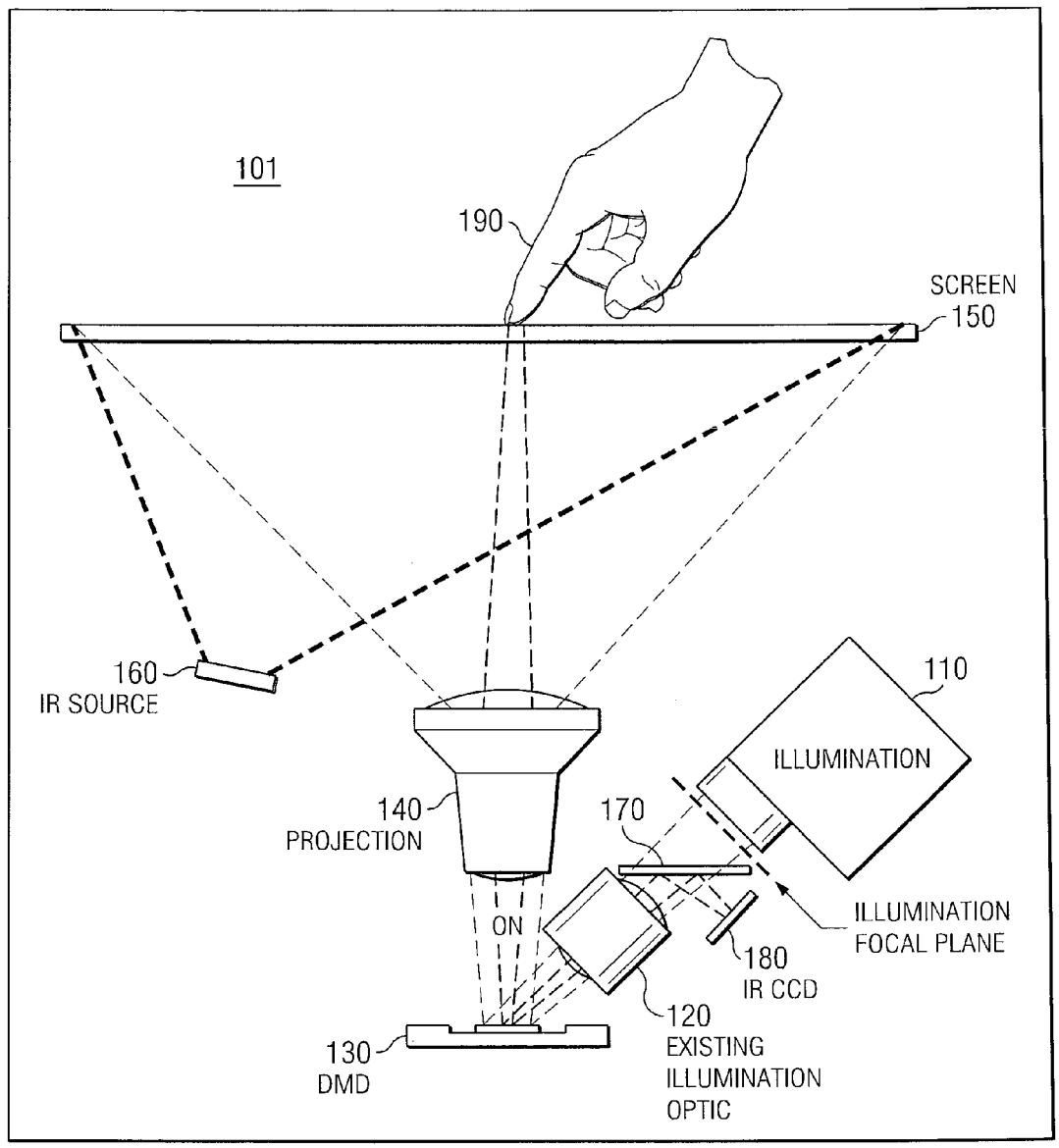
FIG. 1A is a diagram of a portion of a combined image display and capture system.

FIG. 1A is a diagram of one embodiment of a portion of a combined display and image capture system 101. In this example, system 101 includes a light source 110, a reflecting lens 170, an illumination optic 120, a digital micromirror device (DMD) 130, a projection system 140, a screen 150, an infrared light source 160, a reflecting lens, and an infrared charge-coupled device (CCD) 180. The CCD can be used for capturing images reflected on its photoactive region in a variety of electromagnetic spectrums, particularly visible light and infrared light. CCDs are well known in the art. In addition to CCDs, any type of image capture device known in the art may be used such as CMOS or other light sensors such as photodiodes. DMD 130 is but one example of a spatial light modulator that can be used and any of a number of spatial light modulators may be used. DMDs may offer better response times compared to other spatial light modulators. Light source 110 includes one or more lenses, LEDs, lasers, ambient light sources or other light sources for generating and focusing an illumination light beam. Light source 110 can include any suitable number of light sources appropriate for generating light for transmission to DMD 130. Projection system 140 can include one or more lenses and lens support structures for focusing and projecting light from the DMD to the screen 150. Screen 150 can be any image field. It may be made of a number of known transparent or semitransparent materials of flat or non-flat surfaces for the display of images and video in a projection system. Infrared light source 160 can include any of numerous known infrared light projection devices and systems. In addition, light source 160 can also be any source of light, such as visible light or any other spectrum of light. Ambient light may also be used in addition to light from a light pen. Reflecting lens, or dichroic filter, 170, placed between light source 100 and illumination optic 120, can be made of a variety of known materials. Reflecting lens 170 can filter visible and infrared light in such a way as to allow visible light from light source 110 to pass through it to the illumination optic 120 while allowing infrared light to reflect from the DMD 130 to the CCD 180. Instead of an infrared dichroic, other dichroics or a partially reflective mirror could also be used to capture different wavelengths of light, including color. Likewise, instead of an infrared light source 160 and infrared CCD 180, light sources and CCDs or image capture devices for light at other frequencies or wavelengths may be used.

When system 101 operates, light source 110 directs visible light through the reflective mirror 170 to existing illumination object 120 to the active area of DMD 130. The micromirrors on the active area of the DMD 130 create an image and reflect that image through the projection system 140 during the on state of the DMD. Projection system 140 projects the image from the DMD onto the screen 150. In this manner, system 100 displays images and/or video on screen 150. In addition, the combined image display and capture system 100 includes elements that allow for the capturing of images on screen 150. System 100 can include infrared light source 160 that projects infrared light onto screen 150. This infrared light is reflected off the screen 150 into the projection system 140. Projection system 140 directs the infrared light to the DMD 130. DMD 130 directs the infrared light through the existing illumination optic 120. Reflecting lens 170 is placed between the illumination optic 120 and the CCD 180, such that a CCD 180 receives reflected light from the lens 170 to capture an image of the screen 150. CCD 180 subsequently takes the infrared light it receives from the reflecting lens 170 and captures the infrared image on the screen 150. It should be noted that CCD 180 is but one example of an image capture sensor. Other image capture sensors well known in the art may be used including photodiodes, infrared sensors, and visible light sensors. In this manner, images can both be displayed onto screen 150 and captured from screen 150. In the event a color image is to be captured, it may be desirable to capture an image during a short duration of time with the DMD blanked in order to capture an image without interference with projected light.

The image capture capability of system 101 can facilitate interactions with the displayed images. FIG. 1A shows interaction 190 with screen 150. In the case of infrared image capture, infrared light, or heat, from an interaction 190 or reflected by interaction 190, such as a human finger, is passed from screen 150 to the CCD 180 in the manner discussed above. Interactions 190 with the screen 150 can be detected using known signal processing methods whereby the infrared signature or pattern of the interaction can be detected from the image captured on the CCD 180. In addition to the location of the interaction, the size and the shape of the interaction can also be detected using signal processing algorithms by a signal processing system connected to CCD 180 (not shown). In addition, the infrared image captured by infrared CCD 180 can be combined with information of the visible light image projected onto screen 150. This information can be combined to determine the location of interaction 180 with screen 150, the size of the interaction, the shape of the interaction, and the duration of the interaction. The infrared image of screen 150 and the visible light image of screen 150, already known by the signal processing system in order to display the content, can also be combined to manipulate the projected visible light image, for instance to sharpen the image or add color.

Figure 1B:
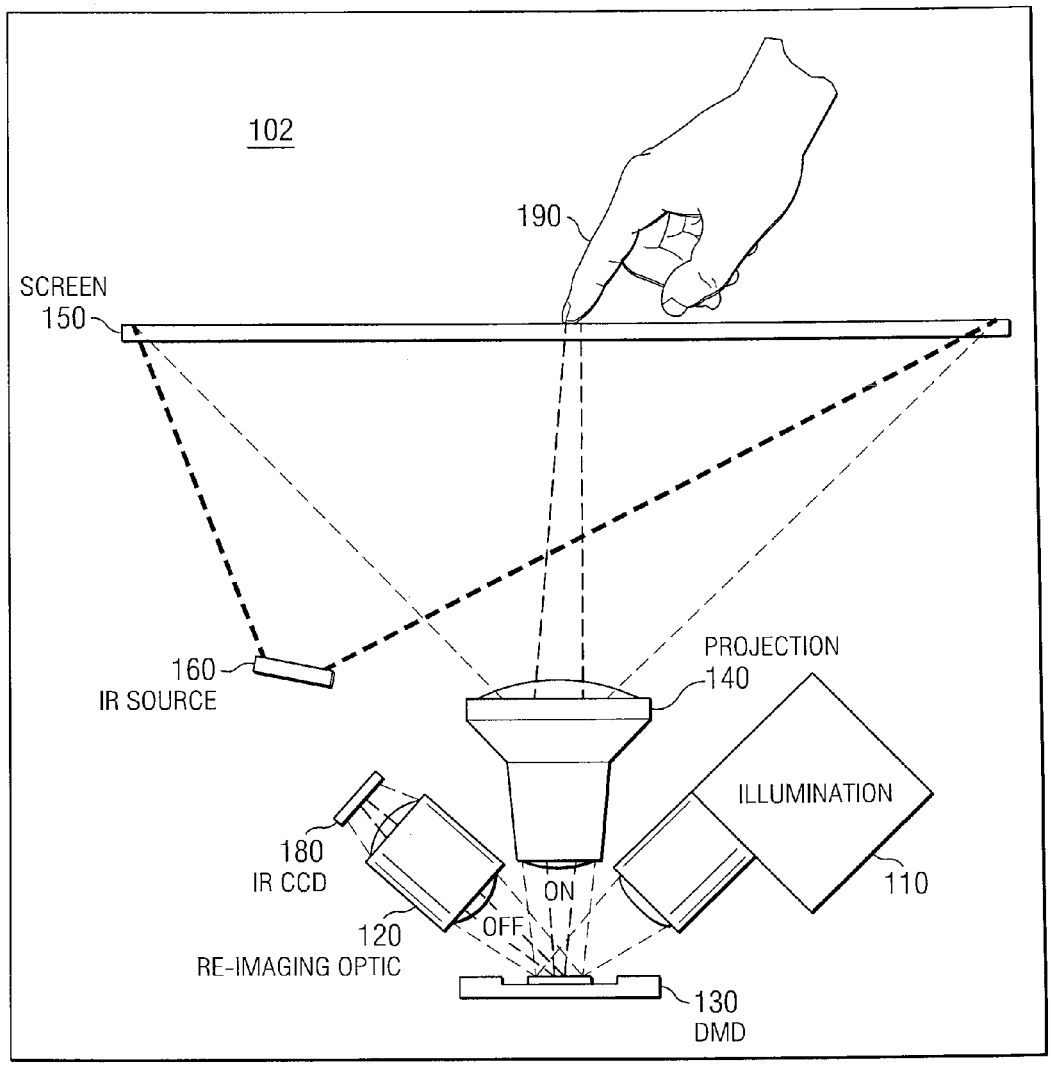
FIG. 1B is a diagram of a portion of a combined image display and capture system.

In another embodiment shown in FIG. 1B, a reimaging optic 120 is used to capture a focused image of the screen 150 reflected from DMD 130. In this embodiment, the DMD 130 directs the infrared image of screen 150 to reimaging optic 120 during the DMD's "off" state, while the DMD is not reflecting a visible light image on screen 150. Instead, in the off state, the micromirrors of DMD 130 reflect the infrared image of screen 150 to the reimaging optic 120 and onto infrared CCD 180. The off state can occur at various intervals dictated by system needs and can be arranged so that no detectable interruption to the displayed image on screen 150 is detectable to the eye. In this embodiment, interaction facilitation and image processing would operate in the same manner as discussed above in reference to FIG. 1A.

In addition, in each of the embodiments discussed with respect to FIGS. 1A-1B, the light source can also be in front of the screen 150 in the form of a light pen projecting infrared light onto screen 150. Interaction with screen 150 is achieved by directing light from a light pen to various portions of screen 150 and directing that light ultimately to a CCD or image capture system in the manner discussed in detail above.

In some embodiments, an optical processor can determine that an interaction is occurring at the location of the screen associated with the area of the DMD or spatial light modulator directed to the image capture system. In such arrangements, only portions of the spatial light modulator are directed to the image capture system at a time. This can allow the system to localize targets on the surface of the screen using a variety of two-dimensional search algorithms.

In other embodiments, an interaction is detected in the following manner. The DMD will direct known areas of the DMD associated with areas of screen to the image capture system. For instance, one or more micromirrors on the DMD will direct light to the image capture system. These micromirrors are associated with areas of screen. When the image capture system detects light above a predetermined threshold, an optical processor can determine that an interaction is occurring at the location of the screen associated with the area of the DMD directed to the image capture system. This can allow the system to localize targets on the surface of the screen using a variety of known two-dimensional search algorithms.

Figure 2A:
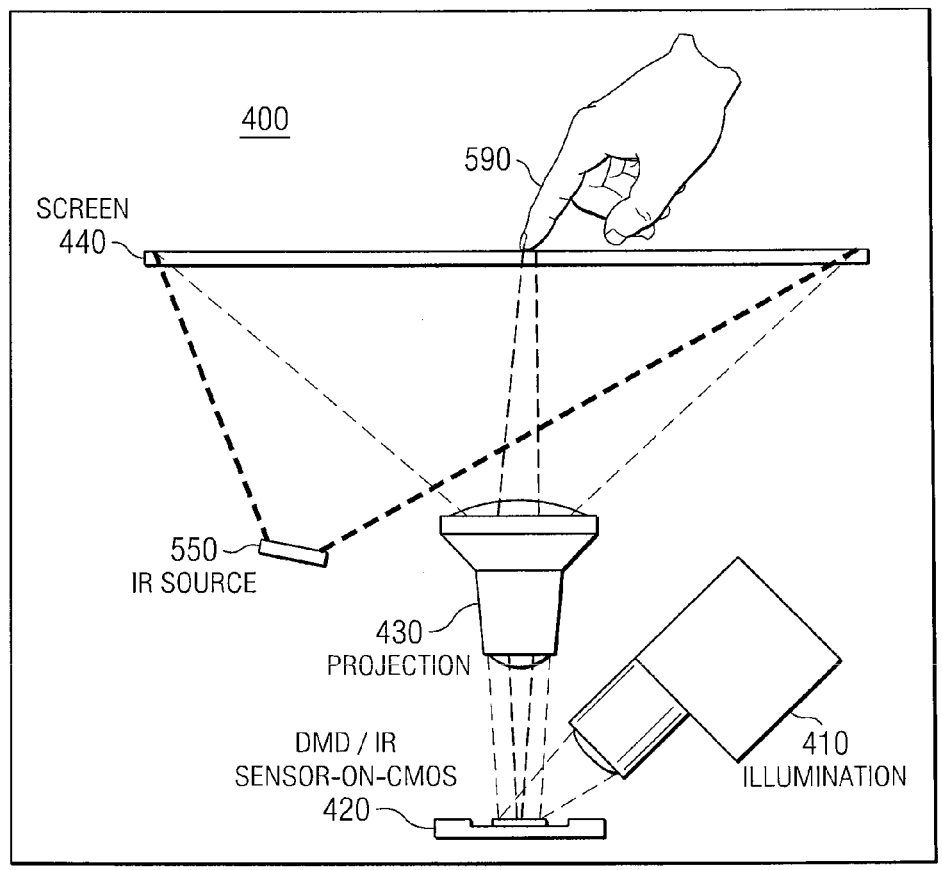
FIG. 2A is a diagram of a portion of a combined image display and capture system.

In another embodiment in reference to FIG. 2A, combined system 400 is shown. System 400 projects images and video to screen 440 in the manner described above with respect to FIGS. 1A-2A. The image capture system of system 400 includes infrared light source 550 projecting infrared light to screen 440. The infrared light reflected off of screen 440 and directed to projection system 430 includes infrared light from interaction 590 with the screen. Projection system 430 directs the infrared light from screen 440 to the combined DMD and infrared sensor or CCD on CMOS 420.

Figure 2B:
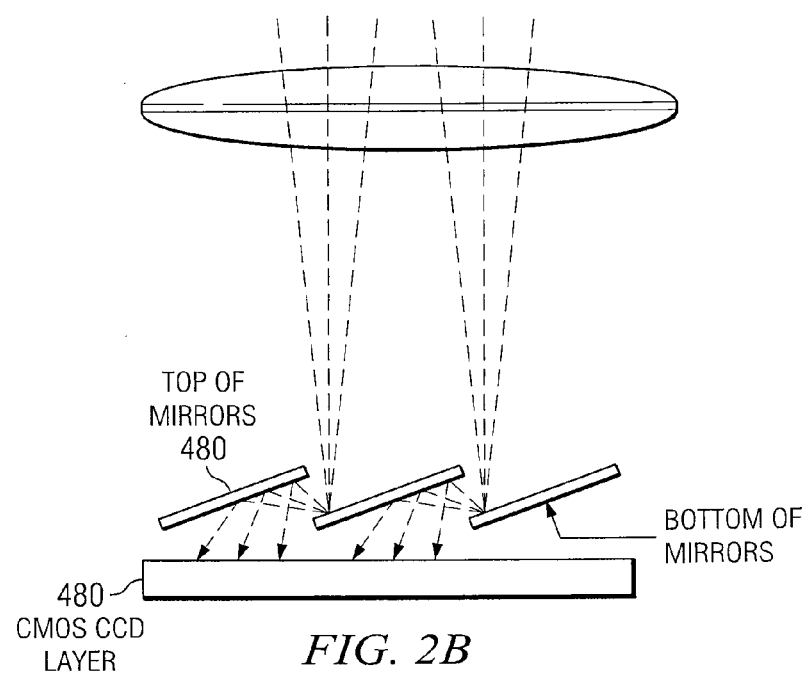
FIG. 2B is a diagram of a portion of a combined image display and capture system.

FIG. 2B shows the details of combined DMD infrared sensor 420. DMD 420 includes digital micromirrors 470 and CMOS CCD or infrared sensor 480 located on a CMOS layer beneath the micromirrors 470. Infrared light is directed on to the CCD layer 480 by first reflecting off the front surface of the micromirrors followed by reflecting off the bottom surface of the micromirrors and finally arriving to the surface of the CCD layer 480. The CCD or infrared sensor 480 can be used to capture the infrared image on screen 440 as discussed with other embodiments above. In embodiments where an infrared sensor 480 is used in system 400, the interaction detection and information system described with respect to FIGS. 2 and 3 may be used. In embodiments where a CCD 480 is used in system 400, the interaction detection and information system described with respect to FIG. 1A-1C may be used.

The combined image display and capture systems of the present invention may employ all, some, or none of the features or components discussed and illustrated in FIGS. 1-4.

Numerous other changes, substitutions, variations, alterations, and modifications may be ascertained to one skilled in the art and it is intended that the present invention encompass all such changes, substitutions, variations, alterations, and modifications as falling within the scope of the appended claims. For example, it will be understood that although a particular embodiment may show an infrared light source and sensor, other lights sources and sensors for other electromagnetic frequencies may be used.

What is claimed is:

1. A combined image projection and capture system comprising:
    a visible light source;
    a spatial light modulator comprising an array of reflecting surfaces movable between on and off state positions;
    an illumination optic located between the visible light source and the spatial light modulator and configured to direct visible light from the visible light source to the spatial light modulator for modulating the visible light according to the on and off state positions of the reflecting surfaces;
    a projection system for projecting the modulated visible light onto a display surface;
    a non-visible light source positioned to direct light onto the display surface;
    an imaging sensor; and
    an image capture system including a light diverting element positioned between the illumination optic and the visible light source and configured to divert non-visible light reflected from the display surface through the projection system, the reflecting surfaces and the illumination optic onto the imaging sensor.

2. The system of claim 1, wherein the spatial light modulator is a digital micromirror (DMD) device, and the reflecting surfaces are micromirrors tiltable between positive and negative angles corresponding to the on and off state positions.

3. The system of claim 1, wherein the imaging sensor comprises a member of the set consisting of a CCD, a CMOS device, an infrared sensor, and a photodiode.

4. The system of claim 1, wherein the non-visible light source is an infrared light source.

5. The system of claim 1, wherein the reflecting surfaces are micromirrors of a digital micromirror device, and the imaging sensor is a CMOS, CCD or infrared sensor.

6. The system of claim 1, wherein the light diverting element is a reflecting lens.

7. A combined image projection and capture system comprising:
    a visible light source;
    a digital light modulator comprising an array of micromirrors movable between on and off state positions;
    an illumination optic located between the visible light source and the digital light modulator and configured to direct visible light from the visible light source to the digital light modulator for modulating the visible light according to the on and off state positions of the micromirrors;
    a projection system for projecting the modulated visible light onto a screen;
    an infrared light source positioned to direct infrared light onto the screen;
    an infrared light sensor;
    an infrared light reflecting element positioned between the illumination optic and the visible light source and configured to divert infrared light reflected from the screen through the projection system, the micromirrors and the illumination optic onto the infrared light sensor.

8. The system of claim 7, wherein the infrared light reflecting element comprises a dichroic filter element that passes visible light and reflects the infrared light.

9. The system of claim 8, wherein the infrared light source comprises a CCD.

* * * * *